United States Patent
Cruz Huertas et al.

(10) Patent No.: US 10,572,599 B2
(45) Date of Patent: *Feb. 25, 2020

(54) CONTEXTUAL FIT DETERMINATION FOR PROPOSED MESSAGES

(71) Applicant: INTERNATIONAL BUSINESS MACHINES CORPORATION, Armonk, NY (US)

(72) Inventors: Luis C. Cruz Huertas, San Jose, CA (US); Luis A. Mena Monge, La Aurora (CR); Jose P. Monge Bolanos, Barva (CR); Edgar A. Zamora Duran, Santo Domingo (CR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/380,552

(22) Filed: Apr. 10, 2019

(65) Prior Publication Data

US 2019/0236145 A1 Aug. 1, 2019

Related U.S. Application Data

(63) Continuation of application No. 15/428,423, filed on Feb. 9, 2017.

(51) Int. Cl.
*G06F 17/27* (2006.01)
*H04L 12/58* (2006.01)
(Continued)

(52) U.S. Cl.
CPC ........ *G06F 17/2785* (2013.01); *G06F 17/276* (2013.01); *G06F 17/2775* (2013.01);
(Continued)

(58) Field of Classification Search
CPC .............. G06F 17/2785; G06F 17/276; G06F 17/2775; G06F 17/25; H04L 51/30; H04L 51/02; H04M 7/0042
(Continued)

(56) References Cited

U.S. PATENT DOCUMENTS 8,706,827 B1 * 4/2014 Noble .................. G10L 13/027
709/206
9,363,104 B2 7/2016 Noble et al.
(Continued)

OTHER PUBLICATIONS

"Understand Your Tone Score", [retrieved on Jan. 25, 2017]. Retrieved from the Internet< URL:https://www.ibm.com/smarterplanet/us/en/ibmwatson/developercloud/doc/tone-analyzer/understanding-tone.shtml >, Tone Analyzer Service Documentation | Watson Developer Cloud, 3 pgs.
(Continued)

*Primary Examiner* — Edwin S Leland, III
(74) *Attorney, Agent, or Firm* — Michael O'Keefe; Matthew M. Hulihan; Heslin Rothenberg Farley & Mesiti PC

(57) ABSTRACT

Determining whether a proposed message contextually fits a messaging session. A method obtains a proposed message to be sent in a messaging session between users of a messaging service. The method identifies a context of the proposed message. The method determines whether the proposed message contextually fits the messaging session based on characteristics of an expected response to the proposed message, the characteristics of the expected response being based on patterns of communication between the users. The method also performs processing based on whether the proposed message contextually fits the messaging session.

16 Claims, 14 Drawing Sheets

(51) Int. Cl.
    *H04M 7/00* (2006.01)
    *G06F 17/25* (2006.01)
(52) U.S. Cl.
    CPC .............. *H04L 51/02* (2013.01); *H04L 51/04* (2013.01); *H04L 51/30* (2013.01); *G06F 17/25* (2013.01); *H04M 7/0042* (2013.01)
(58) Field of Classification Search
    USPC .......................................................... 704/9
    See application file for complete search history.

(56) References Cited

U.S. PATENT DOCUMENTS

| | | | | |
|---|---|---|---|---|
| 2015/0200895 | A1* | 7/2015 | Ding | H04L 51/34 709/206 |
| 2016/0147731 | A1* | 5/2016 | Parikh | G06F 17/276 715/261 |
| 2016/0173421 | A1* | 6/2016 | Alshinnawi | H04L 51/046 709/206 |
| 2016/0180735 | A1* | 6/2016 | Clark | G09B 5/02 434/236 |
| 2016/0182410 | A1* | 6/2016 | Janakiraman | G06F 17/2785 709/206 |
| 2016/0255037 | A1* | 9/2016 | Spivack | G06Q 10/10 706/12 |
| 2016/0366088 | A1* | 12/2016 | Abou Mahmoud | H04L 51/30 |
| 2016/0381533 | A1* | 12/2016 | Fogelson | H04W 4/18 455/414.1 |
| 2017/0091633 | A1* | 3/2017 | Vemula | G06Q 10/06 |
| 2017/0093952 | A1* | 3/2017 | Kumar | H04L 51/18 |
| 2017/0126599 | A1* | 5/2017 | Qi | H04L 51/10 |
| 2017/0308267 | A1* | 10/2017 | Kozloski | G06F 17/2217 |
| 2018/0152403 | A1* | 5/2018 | Charignon | H04L 51/16 |
| 2018/0225279 | A1* | 8/2018 | Cruz Huertas | G06F 17/2785 |
| 2018/0316637 | A1* | 11/2018 | Desjardins | H04L 51/046 |

OTHER PUBLICATIONS

"Personality Insights", [retrieved on Jan. 25, 2017]. Retrieved from the Internet:< URL:https://www.ibm.com/watson/developercloud/personality-insights.html >, Personality Insights | IBM Watson Developer Cloud, 4 pgs.

"Output: Understanding a Profile", [retrieved on Jan. 25, 2017]. Retrieved from the Internet:< URL:https://www.ibm.com/watson/developercloud/doc/personality-insights/output.shtml >, Personality Insights Service Documentation | Watson Developer Cloud, 10 pgs.

"Input: Requesting a Profile", [retrieved on Jan. 25, 2017]. Retrieved from the Internet< URL:https://www.ibm.com/watson/developercloud/doc/personality-insights/inputshtml Personality Insights Service Documentation | Watson Developer Cloud, 5 pgs.

Mell, Peter, et al., "The NIST Definition of Cloud Computing", NIST Special Publication 800-145, Sep. 2011, Gaithersburg, MD, 7 pgs.

"Tone Analyzer", [retrieved on Jan. 26, 2017]. Retrieved from the Internet< URL: https://www.ibm.com/watson/developercloud/tone-analyzer.html>, Tone Analyzer | IBM Watson Developer Cloud, 4 pgs.

List of IBM Patents or Applications Treated as Related, Apr. 10, 2019, 2 pgs.

* cited by examiner

| 302 — Personal pattern for UserID 123456 | | | | | | | |
|---|---|---|---|---|---|---|---|
| | Context | | | | | Expected Response | |
| | Emotion | Sentiment | Culture | Language | Common expressions / words | Personality | Emotion | Sentiment |
| 304 — Group: Friends | Joy (50%-75%) | Positive (50%-100%) | Costa Rica | English | "Pure Life" / "It's all good" | Big5: Openness (80%) Needs: Harmony (70%) | Joy (40%-90%) | Positive (40%) |
| 306 — Group: Wife | ... | | | | | | | |
| 308 — Group: Work Team | ... | | | | | | | |

| 310 — Personal pattern for UserID 987654 | | | | | | | |
|---|---|---|---|---|---|---|---|
| | Context | | | | | Expected Response | |
| | Emotion | Sentiment | Culture | Language | Common expressions / words | Personality | Emotion | Sentiment |
| Group: Neighbors | Joy (30%-100%) | Positive (20%-100%) | Anytown | English | "Happy Holidays" / "No Worries" | Big5: Neuroticism – Anger (70%) Needs: Love (4%) | Anger (60%-90%) | Negative (60%) |
| Group: Family | | | | | | | | |

FIG. 3

| UserID 123456 Expected Response | | |
|---|---|---|
| Personality | Emotion | Sentiment |
| Big5: Openness (80%) Needs: Harmony (70%) | Joy (40%-90%) | Positive (40%) |
| UserID 123456 Response Analysis | | |
| Personality | Emotion | Sentiment |
| Big5: Openness (90%) Needs: Harmony (77%) | Joy (86%) | Positive (60%) |
| New UserID 123456 Expected Response | | |
| Personality | Emotion | Sentiment |
| Big5: Openness (85%) Needs: Harmony (73.5%) | Joy (55%-90%) | Positive (50%) |

402 — (row 1 data)
404 — (row 2 data)
406 — (row 3 data)

FIG. 4

| Group Pattern for GroupID 123ABC | | | | | | | | |
|---|---|---|---|---|---|---|---|---|
| | Context | | | | | Expected Response | | |
| | Emotion | Sentiment | Culture | Language | Common expressions / words | Personality | Emotion | Sentiment |
| | Joy (50%-95%) | Positive (40%-93%) | Costa Rica, Anytown | English | "Happy Holidays" / "No Worries" | Big5: Neuroticism - Anger (50%) Needs: Love (10%) | Anger (40%-80%) | Negative (69%) |
| Personal Pattern for UserID User1 | Joy (47%-100%) | Positive (30%-94%) | Costa Rica, Anytown | English | "Happy Holidays" / "No Worries" | Big5: Neuroticism - Anger (10%) Needs: Love (10%) | Anger (15%-50%) | Negative (65%) |
| Personal Pattern for UserID User2 | Joy (46%-90%) | Positive (50%-92%) | Costa Rica, Anytown | English | "Happy Holidays" / "No Worries" | Big5: Neuroticism - Anger (90%) Needs: Love (10%) | Anger (70%-80%) | Negative (79%) |
| Personal Pattern for UserID User3 | Joy (53%-90%) | Positive (35%-91%) | Costa Rica, Anytown | English | "Happy Holidays" / "No Worries" | Big5: Neuroticism - Anger (30%) Needs: Love (10%) | Anger (25%-85%) | Negative (59%) |
| Personal Pattern for UserID User4 | Joy (54%-100%) | Positive (45%-95%) | Costa Rica, Anytown | English | "Happy Holidays" / "No Worries" | Big5: Neuroticism - Anger (70%) Needs: Love (10%) | Anger (50%-75%) | Negative (71%) |

FIG. 5

| Response Element | Value | Threshold | Type |
|---|---|---|---|
| Personality | Anger | 90% | Max |
|  | Love | 15% | Min |
| Emotion | Joy | 2% | Min |
|  | Anger | 80% | Max |
| Sentiment | Negative | 90% | Max |
|  | Positive | 2% | Min |

FIG. 6

CONTEXTUAL FIT DETERMINATION FOR PROPOSED MESSAGES

BACKGROUND

Users of mobile devices and other computer systems frequently use messaging applications to rapidly send messages and media to other users or groups of users. Texting and other forms of instant messaging are especially convenient due to the instant communication and versatility that they offer. However, because electronic messaging does not take place face-to-face, exchanges may lack context and negatively impact the conversation or the participants themselves. As an example, a user may write an innocent joke to a friend not realizing the friend is hypersensitive at the time because of a recent family tragedy. Due to the emotional charge of the situation, the friend may take the user's message poorly, leaving both parties feeling uncomfortable. As another example, a user may intend to send a personal message to her spouse, Phil, but accidentally select a group chat with her Ph.D. students after typing the letters 'P-h' into the messaging application, resulting in a potentially embarrassing misdirection of the message.

SUMMARY

Shortcomings of the prior art are overcome and additional advantages are provided through the provision of a computer-implemented method. The method obtains a proposed message to be sent in a messaging session between users of a messaging service. The method identifies a context of the proposed message. The method determines whether the proposed message contextually fits the messaging session based on characteristics of an expected response to the proposed message, the characteristics of the expected response being based on patterns of communication between the users. The method also performs processing based on whether the proposed message contextually fits the messaging session.

Further, a computer system is provided that includes a memory and a processor in communications with the memory, wherein the computer system is configured to perform a method. The method obtains a proposed message to be sent in a messaging session between users of a messaging service. The method identifies a context of the proposed message. The method determines whether the proposed message contextually fits the messaging session based on characteristics of an expected response to the proposed message, the characteristics of the expected response being based on patterns of communication between the users. The method also performs processing based on whether the proposed message contextually fits the messaging session.

Yet further, a computer program product including a computer readable storage medium readable by a processor and storing instructions for execution by the processor is provided for performing a method. The method obtains a proposed message to be sent in a messaging session between users of a messaging service. The method identifies a context of the proposed message. The method determines whether the proposed message contextually fits the messaging session based on characteristics of an expected response to the proposed message, the characteristics of the expected response being based on patterns of communication between the users. The method also performs processing based on whether the proposed message contextually fits the messaging session.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts example personal patterns of expected response characteristics for two users, in accordance with aspects described herein;

FIG. 4 depicts an example of updating expected response characteristics based on analysis of an actual response, in accordance with aspects described herein;

FIG. 5 depicts an example group pattern of expected response characteristics for a group of users, in accordance with aspects described herein;

FIG. 6 depicts example expected response thresholds, in accordance with aspects described herein;

DETAILED DESCRIPTION

Figure 1:
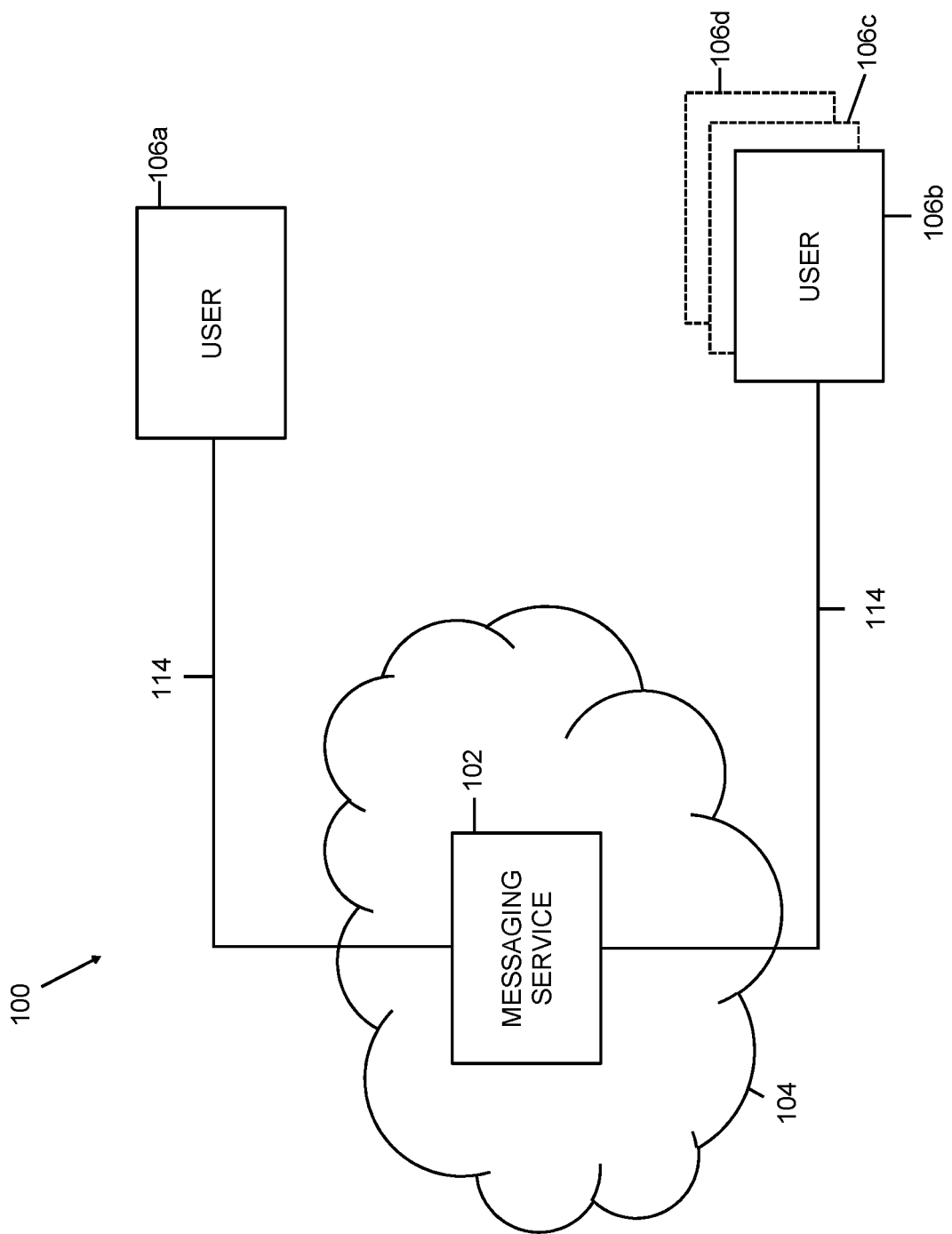
FIG. 1 depicts an example environment to incorporate and use aspects described herein.

Application Programming Interfaces (APIs) exist that can identify sentiments, language, emotions, and other characteristics in text, images, and other digital information, as well as characteristics of the person who wrote the message. Examples include the "Tone Analyzer" and "Personality Insights" offerings on the Watson Developer Cloud provided by International Business Machines Corporation, Armonk, N.Y., U.S.A. However, an understanding of the sentiments of the sender and receivers of the message is relatively limited; it may, for instance, only identify whether a text is appropriate for categories of audiences without taking into account the context of participants, and omitting the desired personalization of the conversation between closely related persons. This occurs at least partially because there is no learning undertaken by these offering for specific end-to-end conversations.

Described herein is an intelligent system that learns how users and groups of users—each with different characteristics—communicate among each other under different circumstances. The system uses that to ascertain how a proposed message to be sent might affect the recipients of the message, as evidenced by how they are expected to respond to the message.

A system is able to learn how a typical conversation in a messaging application between related persons looks under different contexts, and based on this can provide to a conversation participant an indication of the adequacy of a proposed message (text and/or provided media) for the audience, given the context presented by the message. The messaging application may be an application supporting any one or more desired types of messaging including, but not limited, to instant messaging, text messaging, direct messaging, forum messaging, and chat messaging, as examples. "Conversation" in this context refers to a messaging session—a targeted subset of communications of a thread or larger set of messages between two users or a larger group of users. For instance, in a long thread, users may discuss serially and/or simultaneously different topics that potentially involve different participants of the group. The overall discussion can therefore be broken into messaging sessions. Sessions may, but need not necessarily, correlate to defined timeframes. Several sessions could extend contemporaneously across several days, weeks, or longer, for example. The sentiments of each session may be different across topics.

The system learns what normal or contextually-appropriate communication between users of a session looks like based on, as examples:

(i) Current, or relatively recent, sentiments and emotions of recent messages by a sender and recipient(s). Current/recent may be relative and may vary depending on the situation. It may refer to a window as short as a few hours or as long as several years depending on how dynamic the sentiments of the topic may be;

(ii) Historical sentiments and emotions of messages by the sender and recipients within the same group. A 'group' may be delineated based on an analysis of a messaging session, for instance who is included or registered on the thread, and/or who is actively participating in the discussion of the messaging session. A group may have 10 people, with only five people actively participating. The 'group' in this situation may be all 10 people or just the five active people. A weight can be set for each user according to their activity level, where more idle participants in the session may be weighted less in terms of their contribution to determining the response that may be expected if a proposed message is presented in the messaging session.

(ii) Personality detected in recent messages of the sender and recipient(s);

(iv) Historical personality detected in past messages by the sender and recipient(s) within the same group. This can be factor because, although a user may not be actively participating, the user might still be viewing the messages and therefore is a potential participant who might chime-in if moved to do so;

(v) Detected language, nationality, and culture of senders and recipient(s);

(vi) Historical words/expressions usage in communications of the sender and recipient(s); and (vii) Historical usage of media (images, audio, etc.) in communications between the sender and recipient(s). This may be useful in identifying certain images or other media that may not contextually fit the messaging session.

Learned data about users and the types of responses that can be expected from them given different contexts may be used to advise a sender about whether a proposed message to be sent to specific user(s) contextually fits into the message session established with those specific user(s).

More specifically, a process can evaluate whether the proposed message to be sent as part of a messaging session contextually fits the messaging session based on the learned communications patterns between the participants in the session. Contextual fit can encompass various concepts, for instance an anticipated level of conflict that may be experienced if the proposed message were sent, how closely it conforms to the feelings of the people involved, appropriateness of the message, and convenience of the message. Whether the message contextually fits the messaging session is based on the anticipated reaction of the recipient(s) of the message, i.e. the characteristics of the response that can be expected from them if the proposed message were sent as part of the messaging session. Thus, the anticipated reaction of the recipient(s) is being considered in the determination of the contextual fit for a proposed message that has not yet been sent. The system can advise the composing user as to whether the proposed message contextually fits the messaging session. If not, the user may elect to modify the message to better form to the messaging session. In some embodiments, these aspects are accomplished via a database that stores communication patterns between persons and groups (sentiments, emotion, personalities of conversations, and its contexts), records of data for personal patterns and group patterns, evaluation of a conversation and provision of advice to a user who proposes to send a message that is determined to surpass a threshold indicative of what does and does not contextually fit the conversation, detecting message contexts, and learning from the responses that users contribute to the conversation given the contexts presented by the messages in the conversation.

The patterns that indicated expected response characteristics provide personalization of the analysis of the conversations between individuals and groups of persons and deep learning of the communications between groups of persons. They are used to provide assistance to message senders in order to avoid sending possibly wrong, offensive, or other contextually-unfitting messages to recipients. Additionally, a re-learning is performed as new messages of the session are received, so that the system adapts to the dynamically changing messaging session. Aspects also apply not only to text-based messages but media messages such as picture, audio, and video messages where those messages can carry different context to which recipients may respond differently.

As an example, assume User1 types a personal message expressing love for User2 into a messaging session between members of a sports team on which User1 plays, mistakenly believing it to be a messaging session between only User1 and User2. The system could alert User1 that this message does not contextually fit the messaging session with the sports team group because it is found that the context conveyed by that message is likely to cause a negative reaction (e.g. bullying). As another example, assume User1 is angry because of a troublesome conversation with some coworkers. User1 types a message in a conversation involving a group of friends but because of User1's mood, it negatively influences the way she writes the message and results in a message with a very negative tone/context. User1 may be advised that the message is uncharacteristically negative for this messaging session. Additionally or alternatively, the appropriateness of the message for the session may encompass the fact that another member of the group is detected to be seriously depressed, and such a negatively-toned message from User1 would exacerbate the situation.

FIG. 1 depicts an example environment 100 to incorporate and use aspects described herein. Environment 100 includes a messaging service 102 providing facilities for users to interact by sending messages to each other. Any of various messaging services may be used, and in some examples, messaging service 102 is incorporated into another service, such as a social network offering. The messaging service 102 is hosted in a cloud environment 104 or other network infrastructure, for instance on messaging server(s) thereof represented by 102. Users 106a-106d communicate with the messaging service, e.g. via computer systems represented by 106a-106d that connect to the internet or other network to access the messaging service. As an example, a user uses a computer device of the environment 100 to interact with one or more other users via the messaging service, for instance to send/receive messages. A user device will have client software installed that enables the user of the device to interact with the messaging service and other users thereof. In some examples, the messaging client is a web browser, in which the user navigates to a website and engages with the messaging service (a forum, social media network, etc.) via that website. In other examples, the messaging client on a user device is a mobile application ("app") or other specialized application installed on the client device.

The components in FIG. 1 form wired or wireless network(s) of devices, and communication between the devices takes place via wired or wireless communications links 114 for communicating data between the devices. FIG. 1 is just one example of an environment to incorporate and use aspects described herein; many other examples are possible and contemplated as being compatible with the capabilities described herein.

Figure 2:
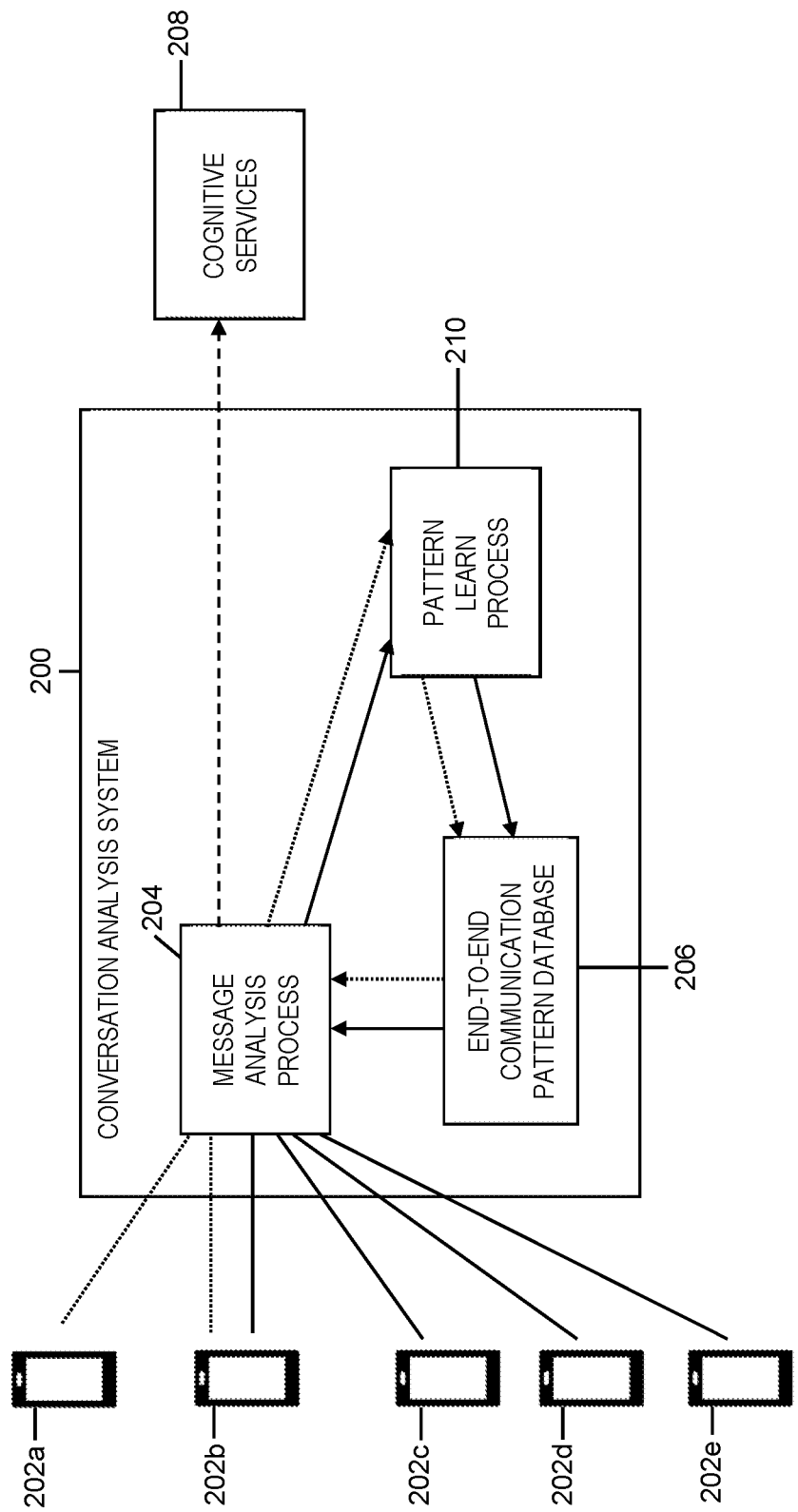
FIG. 2 depicts an example organization of system components to incorporate and use aspects described herein.

FIG. 2 depicts a more detailed example organization of system components to incorporate and use aspects described herein. Central to this is a conversation analysis system (CAS) 200. This may be implemented purely as software, or a combination of hardware and software, for instance as a separate server to those of the messaging service, in some examples. In particular, the CAS may be implemented as an additional module incorporated within or interfacing a messaging service/platform, such as the backend of a chat or other messaging program. In the example of FIG. 2, Users 202a through 202e, represented by mobile devices in the Figure, send and receive messages that are processed by the CAS 200. To help the component interaction representation, FIG. 2 shows User 202b having two conversations—one conversation is a one-on-one conversation with User 202a, shown by dotted lines, and the other conversation is shown with solid lines as part of a larger group conversation, the group involving Users 202b through 202e.

Message analysis process 204 handles the establishment of messaging sessions for group conversations. A session may be regarded in one example as an activity period that halts or terminates upon some degree of inactivity. It may begin with a topic change to the topic of the session and end based on a topic change to a different topic, for instance. The message analysis process 204 also retrieves patterns of communication between the active members of the session (which may be a subset of the group involved in the conversation) from a pattern database 206. The patterns of communication indicate characteristics of an expected response to a proposed message. The expected response may reflect what is expected to be received if the proposed message were sent. In the case of a one-on-one messaging session, there is only one user who can provide a response to the other user's message, and so 'expected response' in this situation can refer to the response by that other user who receives the message. In the case of a group messaging session, there are several users who might potentially respond, though it is not a given that all will necessarily respond. The 'expected response' in this situation can refer to a composite of each expected response for each of the recipients of the group.

The message analysis process 204 retrieves profiles/patterns of each session participant from the pattern database 206, captures group messages, and also accesses (shown by the dashed line in FIG. 2) cognitive services 208 to analyze messages for various purposes, for instance to obtain the textual description of images, songs, and other media, and to identify and extract context of a proposed message, which may be characteristics such as sentiment, language, and emotions. Example cognitive services 208 are Tone Analyzer and Personality Insights noted above.

The message analysis process 204 additionally obtains the message impact, which is the result of comparing an expected response to a proposed message—one that has been typed by a user—against group and/or personal threshold(s) to determine how contextually fitting the proposed message is. It may then provide advice to the composing user depending on the anticipated message impact.

Additionally, the message analysis process 204 sends conversation session data, for instance messages entering the system and/or characteristics thereof, to the pattern learning process 210.

The end-to-end communication pattern database 206 stores the group and personal patterns as well as group/personal thresholds data, both of which are explained in further detail below.

The pattern learning process 210 retrieves patterns of communication between the message session participants from the pattern database 206. It can also analyze responses—individual and collective/aggregated—to sent messages and update group patterns and personal patterns. The patterns store characteristics of expected responses. The pattern learning process can update a user's characteristics of expected responses based on the user's actual responses to sent messages. In this way, the system continually learns how the user reacts, and therefore can be expected to react in the future, to sent messages of varying contexts. The pattern learn process 210 sends updated group and personal patterns to the pattern database 206.

Regarding the pattern learn process 210, elements affected by conversation learning include personal patterns (patterns pertaining to a user), group patterns (patterns pertaining to a group of users), personal thresholds (thresholds pertaining to a user), and group thresholds (thresholds pertaining to a group of users). The patterns include pre-established stored contexts, in other words separate sets of contextual parameters each defining a unique context. A process identifies and matches a context of a proposed message in a messaging session to one of these pre-established stored contexts, if a matching one exists. Each pre-established stored context includes expected response characteristics that have been pre-associated with that context in the pattern based on the learning process. These expected response characteristics that are pre-associated with the stored context are used as characteristics of a response that can be expected (i.e. an expected response) from the audience if the proposed message is sent in the messaging session. The expected response characteristics may be compared to expected response thresholds that are applied to the messaging session to determine whether the proposed message is deemed to contextually fit the messaging session.

The expected response thresholds are thresholds that are set to define what is considered to be contextually fitting of the messaging session. Thus, contextual fit of the proposed message is based at least partially on whether characteristic(s) of the expected response exceed one or more of these expected response thresholds. As a basic example, a threshold might set a maximum level of negativity that a message can be before it is deemed contextually unfit for inclusion in the session, and any message with a negativity level above that threshold may be deemed contextually unfit for that session.

Personal patterns: Personal patterns identify the personality, sentiment, and emotions of expected responses of a specific user (who may be in a specific group), under different contexts. Each different context having an associated expected response is made up of contextual characteristics, including, in examples presented herein, sentiment, emotion, culture, language, and specific expressions/words, though any desired contextual characteristics may be used. The expected response for a given context may be learned and adjusted over time based on messages (e.g. 'generated responses') that the user has generated and sent in the past, as explained herein.

FIG. 3 depicts example personal patterns of expected response characteristics for two users, in accordance with aspects described herein. Personal pattern 302 is for User123456. 304 indicates Group:Friends, which is a group of users referred to as Friends. For either a specific messaging session with this group or across multiple messaging sessions with this group, the characteristics of an expected response from User123456 to a message fitting the context defined by the particular values for Emotion, Sentiment, Culture, Language, and Common expressions/words are shown. Context is defined by the Emotion, Sentiment, Culture, Language, and Common expressions/words in this example. A proposed message is analyzed to identify its context, which is a set of values for Emotion, Sentiment, Culture, Language, and Common expressions/words. This context is located in the personal pattern 302, if present, and User123456 can be expected to respond with a message fitting the Expected Response indicated for that context, i.e. respond with a message having the Personality, Emotion and Sentiment indicated. In the example of FIG. 3, if the context of a sender's message in the messaging session indicated Emotion: Joy (50%-75%), Sentiment: Positive (50%-100%), Culture: Costa Rica, Language: English, and Common expressions/words used: "Pure Life, "It's all good", then User123456 can be expected to respond with a message with the following characteristics: Personality: Big5: Openness (80%), Emotion: Joy (40%-90%), Sentiment: Positive (40%). Thus, the expected response is the kind of response that this user generates in response to a message of a given context.

In FIG. 3, there are two additional rows shown row next to Group:Friends in the personal pattern for User123456. Each of these rows would correspond to a different context. When messaging with Friends, different contexts may be present, depending on each of the messages in the session. There may be a context where Emotion: Joy is '<50%' but all other values remain the same as the context shown, for instance. For each unique context, there will be corresponding expected response characteristics stored in the pattern. Accordingly, tens or even hundreds of different contexts might have been seen in messaging sessions between Group: Friends, and the personal pattern for User123456 can store expected response characteristics of User123456 for each such context.

Also shown is a group Group:Wife 306, and group Group:Work Team 308 for User123456. Group:Wife 306 denotes contexts and respective expected response characteristics of User123456 for messaging sessions with the user's wife, i.e. in one-to-one messaging between the user and his wife. Group:Work Team 308 denotes contexts and respective expected response characteristics of User123456 for messaging sessions with the group of users composing the group Work Team, which may include one or more users other than User123456. Specific characteristics, i.e. percentages, for Emotion, Sentiment, etc. of each of these additional contexts are omitted for convenience, but it is understood that these cells would be populated with the appropriate values in an actual application of this personal pattern.

FIG. 3 also shows a personal pattern 310 for User987654, depicting a single context for group Group:Neighbors and expected response characteristics for that context, as well as a group Group:Family. Again, it is understood that there will typically be many groups identified in a personal pattern for the user and many contexts within each such group in the personal pattern for the user.

The response learning performed by the system may be based on a training period and updated continuously for every response that the user types in a conversation session. In this regard, one aspect will analyze messages, sent by any user, in a session, recognize the context(s) presented by those messages, and correlate them to the context(s) in the personal pattern for User123456. It will then obtain any responses that User123456 sends to see how that User123456 responded for those context(s). It extracts the personality, emotion and sentiment (in this example) of each such User123456 response to a sent message fitting a given context and updates the stored characteristics of the expected response, for that context, in the personal pattern of User123456. Specifically, it can update the percentage values of every element of the expected response, for instance by re-calculating an average for each response element.

Take the following example conversation: User34TR56 is friend of User123456 above and they share the group "Friends". They have a next conversation:

User34TR56->Thank you very much for helping with the task. I really appreciate the collaboration. I did well and I am happy. I wish you the best. Pure life.

User123456->That's good. When you need help, let me know.

Assume that analysis of User34TR56's message indicates a context matching the example context in the personal pattern table 302 of FIG. 3—for instance the context of that message is identified to fit within {Emotion: Joy (50%-75%); Sentiment: Positive (50%-100%); Culture: Costa Rica; Language: English, and Common expressions/words used: "Pure Life, "It's all good"}. User123456 is therefore expected to respond with a message that fits {Personality: Big5: Openness (80%); Emotion: Joy (40%-90%); Sentiment: Positive (40%)}, as shown by the pattern. However, assume that the response from User123456 is analyzed to show different value percentages than what is indicated in the pattern. In this case, the expected response characteristics may be updated based on what User123456 actually typed and sent in response.

FIG. 4 depicts an example of updating expected response characteristics based on analysis of an actual response, in accordance with aspects described herein. The table in FIG. 4 presents three components: 402 are the expected response characteristics of User123456 for the given context as they were stored prior to User123456 sending the response in the example above. Based on User123456 sending the response to User34TR56's message, the system analyzes that sent response by User123456 and determines the characteristics of that actual response to be what is shown by 404. It is seen that these characteristics differ from what was expected, i.e. that shown by 402. The process will therefore update User123456's personal pattern, and specifically the expected response characteristics for that context in light of this new data. In some examples, a model is used to generate the expected response characteristics, and the new data provided by analyzing the actual response sent by the user is used to update that model. Any desired function may be used to generate the updated response characteristics based on the new data. It may be based on an average or weighted average, as examples. The model generates the updated expected response characteristics, shown by 406, and associates those with the stored context in User123456's personal pattern.

Therefore, based on the sending of a message (e.g. User34TR56's message) in a messaging session, a process can obtain actual response(s) (e.g. User123456's response) to the sent message, update, based on the actual response(s), a model that generates the stored expected response characteristics pre-associated with the pre-established stored context (User123456's expected response characteristics), use the updated model to generate updated expected response characteristics (406) for the pre-established stored context, and associate the updated expected response characteristics with the pre-established stored context (e.g. overwrite User123456's expected response characteristics for that context in User123456's personal pattern).

Common expression words in a personal pattern can be a dictionary of common words and expressions used in conversations of that user, in some examples ranked by usage to identify more commonly used words/phrases under a given context. The words/phrases and their rankings may be updated with each conversation. The expression/words can also be tagged with the patterns of location and time of usage. So, as an example, the system could determine that saying "Good night" to the user's boss at 6:00 AM would be contextually unfitting. In this regard, a contextual characteristic may be time of day and/or location.

It is noted that a user's personal pattern may be determined using messages of a given scope, and that different message scopes may be defined to provide multiple different personal patterns for the user. There may be a recent personal pattern for the user that uses the characteristics of messages only relatively recently sent by the user (for instance within a given timeframe like the last day, week, or month), as well as a historical learned personal pattern for the user that uses the characteristics of messages sent by the user over a longer history of time. Additionally or alternatively, the historical learned personal pattern may even consider messages sent across multiple different messaging sessions, rather than just the single messaging session, to develop a more aggregated, learned personal pattern for the user. One reason for maintaining different personal patterns based on different message scopes is that consideration of the historical learned pattern provides a balance to the recent pattern, which is more likely to be influenced by radical or outlier responses from the user that may not accurately represent the user's true response tendencies.

Group pattern: A group pattern can identify the general personality, sentiment and emotions of expected messages for the group under different contexts. As in the above example of personal patterns, the group context is identified by the particular values for Emotion, Sentiment, Culture, Language, and Common expressions/words. However, the group pattern can be a composite of the personal patterns of the members of the group. Specifically, for any given context reflected in the group pattern, the characteristics of the expected group response for that context may be a composite of the personal expected response characteristics for each of the users in that group. The composite may be calculated as an average, weighted average, or any other function of the personal expected response characteristics. Thus, as an example, the values for Personality for each user of the group are averaged, as are the values of Emotion and Sentiment, to form the group values for Personality, Emotion, and Sentiment stored in the group pattern for that context. This reflects that groups usually are more open to certain modes, tones and conversations.

FIG. 5 depicts an example group pattern 500 of expected response characteristics for a group of users, in accordance with aspects described herein. Only one context is covered in FIG. 5—that indicated in row 502, which is a context denoted by the given values of Emotion, Sentiment, Culture, Language, Common expressions/words. There would typically be many more contexts for this Group123ABC in the group pattern 500.

The characteristics of the expected group response for this group context are: {Personality: Big5: Neuroticism—Anger (50%) Needs: Love (10%); Emotion: Anger (40%-80%); Sentiment: Negative (69%)}. These characteristics are a composite of the Personality, Emotion, and Sentiment characteristics of the individual users, for this context. Excerpts from the personal pattern of each of the four users are shown in table 500. It is also seen that the indicated group context is itself a composite of contexts drawn from each of the personal patterns. The specific values of Emotion, Sentiment, Culture, Language, and Common expressions/words vary across the four personal patterns shown for the four users. For purposes of forming a group context to which these four different personal contexts are considered to match, the values are taken to form a composite for each of the parameters of the group context. For instance, a composite of Emotion: Joy is taken across the four personal patterns to indicate an Emotion: Joy (50%-95%) parameter for the group context shown. Composites for Sentiment, Culture, Language, and Common expressions/words are similarly determined from the four personal patterns.

The group pattern may be updated continuously for every message in a conversation session of the group. When a sent message is analyzed and its context in the group pattern is recognized, the system can obtain message(s) sent in response and extract the personality, emotion, and sentiment of those responses to identify the reaction that the sent message drew from the group participants. The system can then update, as described above, the personal patterns of the users sending those messages in response, and recalculate the characteristics of the expected group response using the updated personal pattern data of the users who responded.

Common expression/words in the group pattern can be a dictionary of common words and expressions used in conversations of the group, in some examples ranked by usage to identify more commonly used words/phrase under a given context. The words/phrases and their rankings may be updated with each conversation.

Similar to the possibility of having multiple different personal patterns for a user given different scopes of messages used to determine each personal pattern, there may be multiple different group patterns—a recent group pattern and a historical learned group pattern—for a given group.

Group threshold: Thresholds define maximum/minimum percentages that the values of each expected response element can reach before the related message (message eliciting the expected response(s)) is considered contextually unfitting. There are threshold(s) for each of the expected response characteristics—Personality, Emotion, and Sentiment, in examples described herein. The thresholds may be specified for different levels of granularity. For instance, there may be one set of thresholds applicable to each Group, meaning the same set of thresholds applies to any messaging session of that group. Alternatively, there may be set of thresholds for an individual message session of that Group. Depending on the topic of conversation, for instance, between the same group members, the applicable set of thresholds may differ. Thresholds may be specified by an administrator or other user, and/or learned and tweaked over time as explained herein. In particular examples, initial thresholds are established by an administrator and modified over time as a messaging session or group conversations develop.

The thresholds are used to identify whether the expected response to a proposed message indicates that the proposed message may not contextually fit the messaging session on the basis that the expected elicited response exceeds one or more thresholds. After identifying a pre-established stored context to which the current context of the proposed message matches, where the pre-established stored context has stored expected response characteristics pre-associated therewith which are characteristics of the response to be expected if the proposed message were sent, the process can compare those characteristics of the expected response to expected response thresholds applied to the messaging session. Whether the proposed message contextually fits the session is based at least partially on whether characteristic(s) of the expected response exceeds expected responses threshold(s) set for that session.

FIG. 6 depicts example expected response thresholds, in accordance with aspects described herein, applicable to a messaging session of a given Group of users. Three response elements—Personality, Emotion, and Sentiment—are indicated, which are the same characteristics indicated for expected responses. For the Personality response element, Anger has a maximum threshold of 90% and Love has a minimum threshold of 15%. This means that if the expected response to a proposed message has characteristics of Emotion: Anger>90% and/or Love<15%, then, in some examples, the proposed message will be deemed to not contextually fit the session because it is expected to elicit a response that does not conform to threshold(s) set for the messaging session. The Emotion and Sentiment thresholds have a similar effect.

In some examples, violation of only one threshold is enough to deem the proposed message contextually unfitting, though in other examples the determination of whether the proposed message is contextually fitting accounts for a combination of several thresholds and/or the particular values of the response elements relative to the thresholds, for instance the extent to which a threshold is exceeded or how close the expected response comes to a threshold.

In some aspects, these expected responses thresholds are subject to adjusting. Tweaking a threshold will affect which proposed messages are deemed to contextually fit the session. An overall goal may be to keep a messaging session relatively focused in terms of the contexts presented by the messages thereof, in which case the thresholds may be adjusted to steer the conversation to a more confident or consistent tone, where unrest or other lack of contextual fit is minimized. Conversely, if the messages of a session are considered to be too similar in terms of the contexts presented by the messages thereof, then one or more thresholds may be adjusted to open the realm of what is considered to contextually fit the conversation.

The adjustments may be informed based on the types of responses received given the contexts presented by sent messages. In an example of 'narrowing' a threshold, the initial or original threshold may be adjusted when a configured percentage of the actual responses to an analyzed message fit relatively close to, or surpass, any other thresholds. In this case, the original threshold can be reinforced by increasing/decreasing the threshold by a configured value or percentage (for instance from 0.1% to 1% of the original threshold as an example).

By way of specific example, assume the following:
a sent message is analyzed to have a Sentiment-Negative of 89%;
the Sentiment-Negative threshold for the messaging session is set at Max=90% (so the sent message does contextually fit insofar as the Sentiment-Negative threshold is concerned);
the sent message did not exceed any other applicable threshold for the session; and
75% of actual responses to that sent message have Emotion-Anger 90%, which exceeds the Emotion-Anger threshold of 80%.

By the above, a sent message that 'fit' within the thresholds nevertheless elicited a response (the aggregate or generalization of the actual responses) that did not. In this case, the initial Sentiment-Negative 90% threshold may be adjusted downward by whatever the configured threshold adjustment amount is, for instance down 1% to 89%. The adjustment makes the threshold more restrictive of contextual fit insofar as the Sentiment-Negative threshold is concerned. Consequently, messages are to be generally less Negative to be deemed contextually fitting. The assumed effect of this is that users will be generally less negative with their messaging, assuming heed advice to conform their messages to what is deemed contextually fitting. In turn, it is expected that the responses to messages will be generally less angry, i.e. either fewer relatively angry messages will be sent, and/or the degree of anger generally expressed will be lower, and more likely to conform to the Emotion-Anger threshold of 80% set for the session.

In other words, if a user sends a message that is not restricted by the current thresholds but generates a response that is generally beyond what is the expected response (i.e. anger was 90% on expected 80% max), it may be desired to decrease Max threshold(s) and/or increase Min threshold(s) to avoid the likelihood of producing contextually unfitting responses. In this manner, based on characteristics of a sent message conforming to the expected response thresholds and based on a configurable amount of the actual response(s) having characteristics that exceed or approach any expected response threshold by a configurable margin, the process can adjust at least one expected response threshold to be more restrictive of contextual fit of proposed messages to the messaging session.

In an example of 'widening' a threshold, the original threshold can be relaxed when an analyzed message was sent regardless that it surpassed an initial threshold, and a configured number or percentage of the obtained responses did not surpass any other thresholds. This helps to manage the situation when a related group increases the confidence between the members and a more relaxed vocabulary is allowed.

By way of specific example, assume the following:
a sent message is analyzed to have a Personality-Love of 13%;
the Personality-Love threshold for the messaging session is set at Min=15% (so the message does not contextually fit insofar as the Personality-Love threshold is concerned); and
98% of actual responses to that sent message do not surpass any thresholds for the messaging session.

Based on the above, the system can update the original threshold for Personality-Love from 15% to 14% (a configured 1%) in this scenario. The Personality-Love threshold is loosened here because a sent message that was outside of the threshold did not generate many contextually unfitting responses—98% still fit within the thresholds. The Personality-Love threshold can be loosened to allow messages that are generally of lesser Personality-Love to be sent because the responses they evoke will still generally contextually fit the messaging session.

Thus, the adjusting of a threshold may include (i) based on characteristics of a sent messaged exceeding at least one expected response threshold of the expected response thresholds and based on a configurable amount of the actual response(s) having characteristics that conform to the characteristics of expected response, adjusting the expected response threshold to be less restrictive of contextual fit of proposed messages to the current context, and/or (ii) based on characteristics of the sent message conforming to the expected response thresholds and based on a configurable amount of the actual response(s) having characteristics that exceed or approach any expected response threshold by a configurable margin, adjusting the expected response threshold to be more restrictive of contextual fit of proposed messages to the current context.

Personal thresholds: Personal expected response thresholds may be kept similarly to the group thresholds but for individual users. Each user may be associated with personal expected response thresholds, where such a personal expected response threshold can indicate when a proposed message may be contextually unfit for the particular user, which would allow the identification of a message that might affect one or more users individually despite not being in violation of any group thresholds. Additionally, an extra field for every response element value may be kept as part of the personal expected response thresholds for a user. This is referred to as an extreme, correlating to a configured maximum percentage by which a group threshold can surpass a personal threshold before serious damage to the user is expected, should a message be sent that violates the extreme.

For instance, assume the user's personal expected response threshold is Sentiment-Negative of 50% for conversations dealing with obesity—so the user is uncomfortable with, or otherwise would prefer to avoid, messages with Sentiment-negative higher than 50% in a conversation dealing with obesity. Assume further that the user is in a group where the group expected response threshold is Sentiment-Negative of 85% for conversations dealing with obesity—meaning messages with Sentiment-negative 85% of lower in a conversation dealing with obesity are deemed to contextually fit insofar as the group threshold is concerned. The difference between these thresholds is 35%, which is very large, so frequent group conversations about obesity, which might reach Sentiment-Negativity levels above the user's threshold of 50% while still contextually fitting within the group Sentiment-Negative threshold of 85%, might affect the user. The 35% difference between the thresholds may be considered too extreme a deviation. Accordingly, an administrator or other individual may establish a configured maximum number or percentage by which a proposed message can surpass a personal threshold before the message is considered seriously damaging and therefore contextually unfit regardless of whether it satisfies a threshold of the larger group of users involved in the messaging session. In the example above, this configurable amount may be 10%, in which case the system will advise group members if their proposed message surpasses an extreme threshold of 50%+10% for that user. Thus, the determination of whether the proposed message contextually fits the current context can therefore further include comparing the characteristics of the expected response to the personal expected response thresholds (one of which is Sentiment-Negative 50% for the user), where contextual fit of the proposed message is based at least partially on whether a characteristic of the expected response (e.g. the value for Sentiment-Negativity) exceeds a personal expected response threshold by a configurable margin, i.e. whether an expected response percentage exceeds someone's personal percentage by some configurable amount. Using the above example, if a proposed message in a conversation dealing with obesity is evaluated to have an expected response characteristic of Sentiment-Negativity greater than 50%+10%=60%, the proposed message may be deemed contextually unfit even though that characteristic may contextually fit insofar as the group threshold of 85% is concerned.

A process can perform real time analysis of a proposed message to determine the expected impact of the message in terms of the response it is expected to generate from recipients of the message. This analysis can be performed in real time to analyze messages before delivering them to the messaging session and provide to the composing user advice regarding the contextual fit of the message as it was proposed by the composing user. The process examines what the expected response to the proposed message is expected to be given the context presented by the message. The expected response can explore the historical learned group pattern and the recent group pattern for the group involved in the messaging session. This may also be done individually for each group member, i.e. explore the expected response for the historical learned personal patterns and the recent personal patterns for each individual member of the group (except the sending user). A determination may be made as to whether the proposed message violates an extreme threshold, meaning the proposed message is expected to elicit a response that violates a personal threshold of a user by too excessive a degree. Accordingly, the characteristics of the expected response, which are compared against any applicable threshold, may be determined from one or more of the group consisting of: characteristics of an expected group response based on a learned group pattern for the users of the group, characteristics of an expected group response based on a recent group pattern for the users of the group, characteristics of an expected personal response based on a learned personal pattern for a user of the users, and characteristics of an expected personal response based on a recent personal pattern for a user of the users.

Figure 7A:
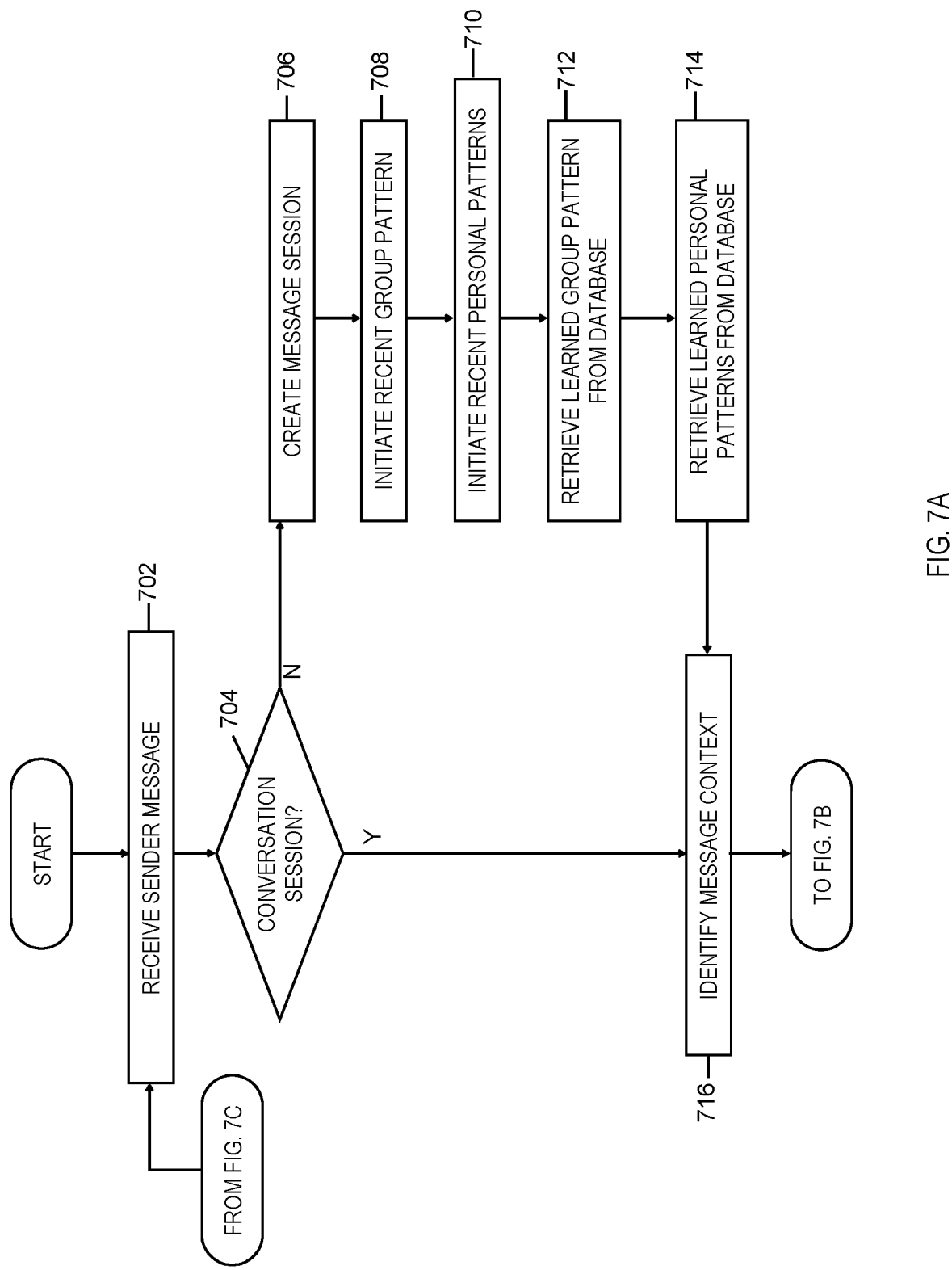
FIGS. 7A-7C collectively depict a process for determining whether a proposed message contextually fits a messaging session, and related processing, in accordance with aspects described herein.
Figure 7B:
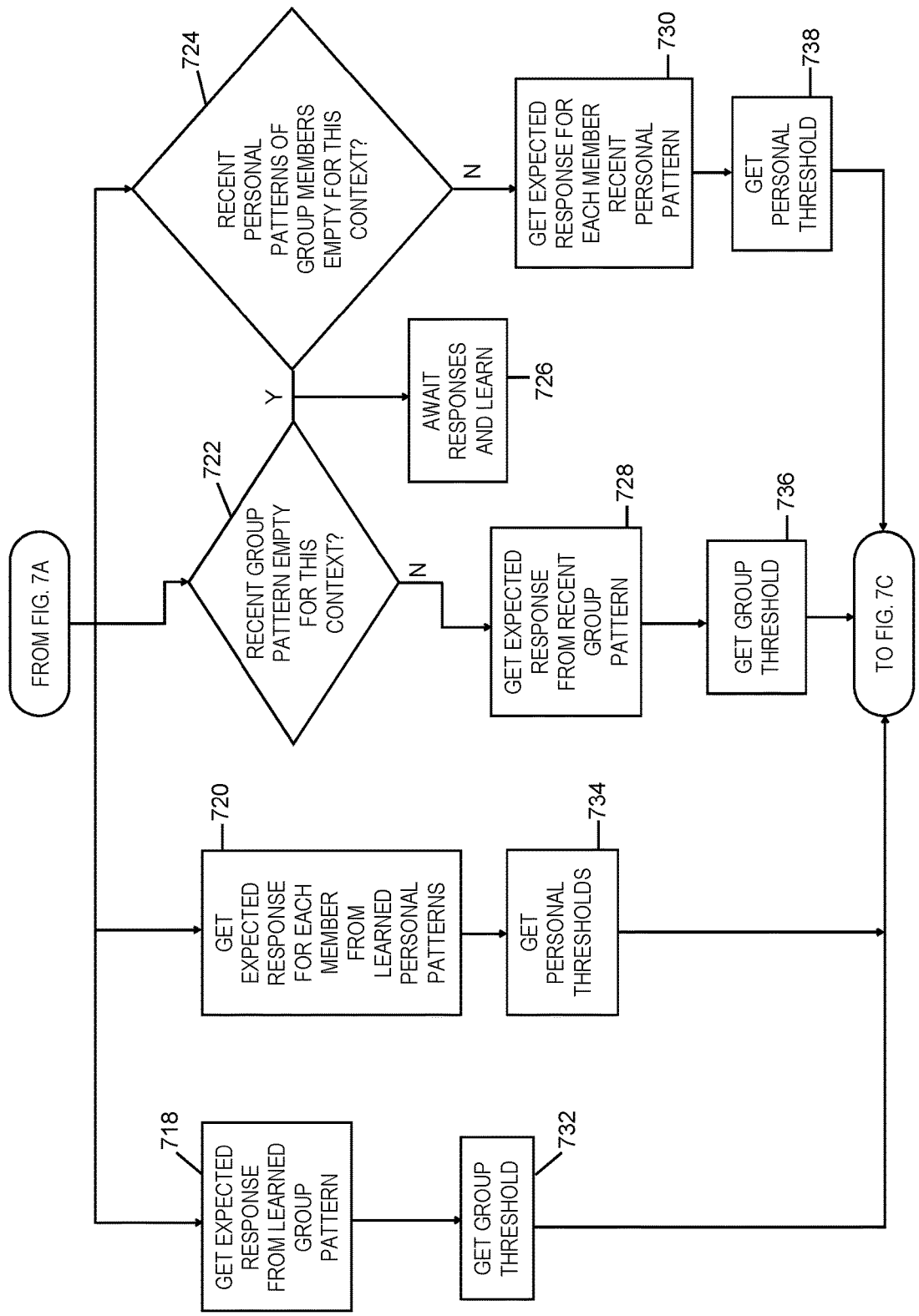
Figure 7C:
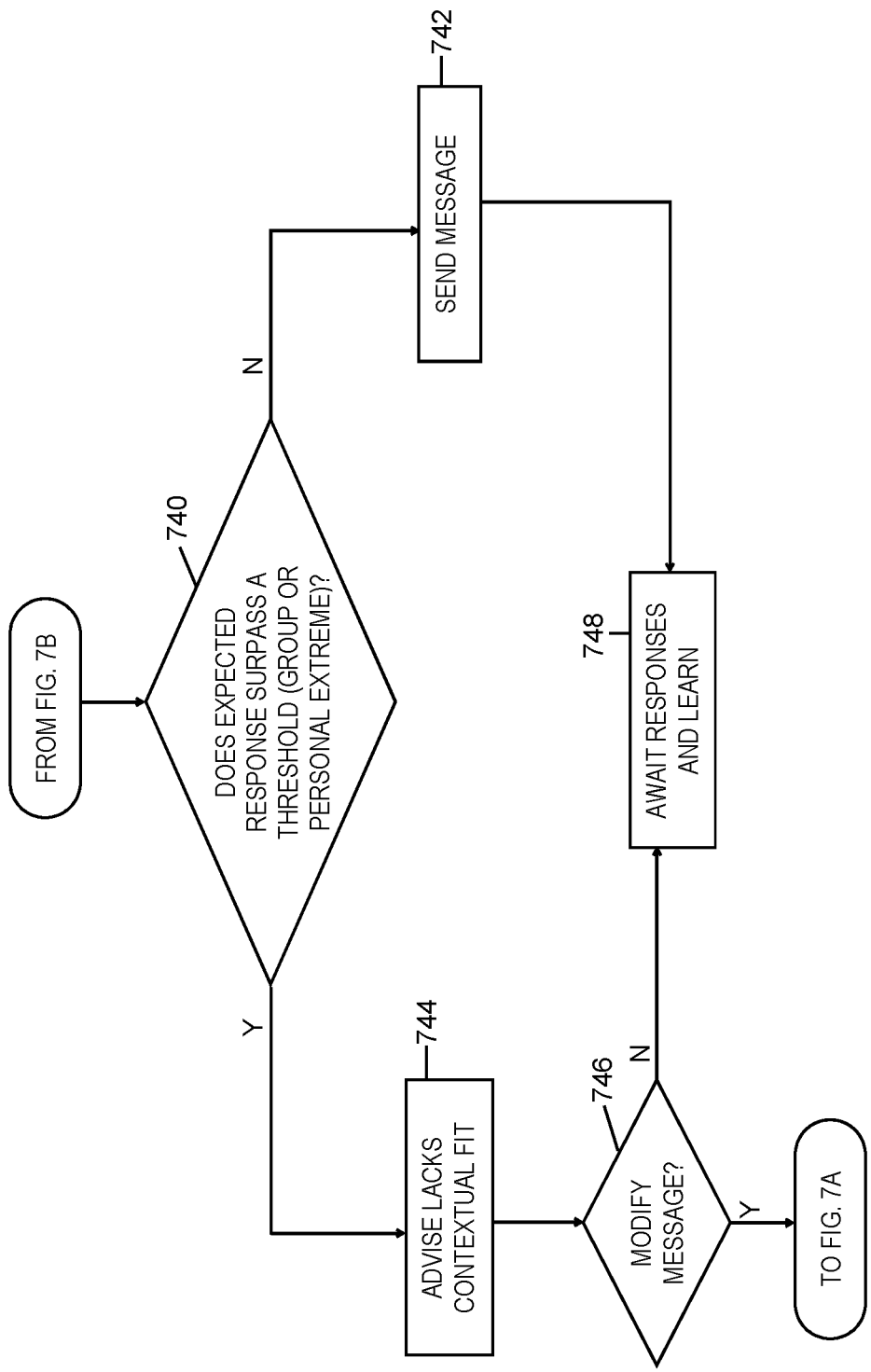

FIGS. 7A-7C collectively depict a process for determining whether a proposed message contextually fits a messaging session, and related processing, in accordance with aspects described herein. In some examples, the process is performed by one or more computer systems, such as those described herein, which may include one or more computer systems of or in communication with a messaging service, such as a conversation analysis system, and/or one of more other computer systems.

The process begins by receiving a sender message (702), and determining whether a conversation/messaging session to which this message pertains exists (704). If this is the first message in the session, for instance, then this initiates the session.

If no conversation session already exists for this message (704, N), the process creates the messaging session (706) and initiates (creates, sets-up, etc.) a recent group pattern (708) and recent personal patterns for each member of the group (710). The recent group and personal patterns correspond to this messaging session and will be updated as the messaging session progresses based on messages that were only relatively recently sent as part of this messaging session. The process then retrieves the learned group pattern (712) and learned personal patterns for the group members (714) from the pattern database. As noted above, the historical learned group and personal patterns may be maintained over a longer amount of time and be based on messages spanning potentially several messaging sessions and/or prior messaging session(s) involving this group. Therefore, these patterns already exist in the database.

After initiating the recent patterns and retrieving the learned patterns, or if at 704 it was determined that a session for this conversation already exists, the process proceeds by identifying the message context (716). The process can identify message context using any desired approach, for instance by leveraging one or more cognitive services such as the Tone Analyzer and/or Personality Insights offerings.

After the process identifies the context of the message, the process proceeds (referring to FIG. 7B) by performing a collection of actions. It gets the expected response, for the identified context, from the learned group pattern (718) and gets the expected responses, for the identified context, for the group members from their respective learned personal pattern (720). In some examples, the pattern of the user who sent the message being analyzed is not included in what is obtained for the group learned or pattern personal learned patterns. By 'getting' an expected response means obtaining the expected response characteristics/values from the pattern. These characteristics may be computed on demand, e.g. for the group expected response by taking a composite of the personal values from the personal patterns if necessary, or may have been pre-calculated and stored to use. The process also determines whether the recent group pattern is empty for this context (722) and whether the recent personal patterns of the group members are empty for this context (724) (i.e. there is no context in the pattern that sufficiently correlates to the identified context of the proposed message).

If the recent group pattern is empty for this context (722, Y), there is no expected response that is based on recent messages in this session that can be ascertained for this context. The process in this regard will await recent responses and learn (726) as the messaging session progresses to build the expected responses for the different contexts of those messages in the recent group pattern. Similarly, if the recent personal patterns are empty for this context (724, Y), there is no expected response that is based on recent messages in this session that can be ascertained for this context. The process will again in this regard await recent responses and learn (726) as the messaging session progresses to build the expected responses for the different contexts of those messages in the recent personal patterns for the users.

If instead at 722 it is determined that a recent group pattern is not empty for this context, i.e. an expected response can be gleaned from the recent group pattern, the process then gets the group expected response from the recent group pattern (728). Similarly, if it is determined at 724 that recent personal patterns of the group members are not empty for this context, i.e. expected responses can be gleaned from these patterns, the process then gets the expected responses from the recent personal patterns (730).

At this point, the process has (i) characteristics of an expected group response, for this context, based on the learned group pattern (from 718), and (ii) characteristics of expected personal responses, for this context, based on the learned personal patterns (from 720). It may also have (iii) characteristics of an expected group response, for this context, based on the recent group pattern if such pattern was not empty for that context (from 728), and (iv) characteristics of expected personal responses, for this context, based on the recent personal patterns, if such patterns were not empty for that context (from 730). This group of expected responses may be collectively referred to as the 'expected response' to the proposed message, and the 'characteristics of the expected response to this proposed message' may incorporate any one or more of the above characteristics.

The process will then obtain the threshold(s) associated with each of the applicable items (i)-(iv) above. Thus, the process will obtain the group threshold (732), personal thresholds (734), and, if applicable, the group threshold (736) which may be the same or different from the threshold obtained at 732, and personal thresholds (738) which may be the same of different from the thresholds obtained at 734.

With the characteristics of the expected response based on learned group, learned personal, recent group (if applicable), and recent personal (if applicable) patterns, as well as the corresponding thresholds to which those characteristics are to be compared, the process proceeds (referring to FIG. 7C) by determining whether the expected response surpasses a threshold (e.g. group threshold, personal threshold(s), or "extreme" threshold) (740). Thus:

the expected response based on the learned group pattern is compared to the applicable configured expected responses threshold(s). If the expected response based on the learned group pattern exceeds such an expected response threshold, the proposed message is deemed to not contextually fit the messaging session;

the expected response based on a learned personal pattern is compared to the applicable configured personal extreme expected responses threshold(s). If the expected response based on the learned personal pattern exceeds such an extreme expected response threshold, the proposed message is deemed to not contextually fit the messaging session;

if applicable, the expected response based on the recent group pattern is compared to the applicable configured expected responses threshold(s). If the expected response based on the recent group pattern exceeds such an expected response threshold, the proposed message is deemed to not contextually fit the messaging session; and if applicable, the expected response based on a recent personal pattern is compared to the applicable configured extreme expected responses threshold(s). If the expected response based on the recent personal pattern exceeds such an extreme expected response threshold, the proposed message is deemed to not contextually fit the messaging session.

If none of the thresholds are exceeded as indicated by the above comparisons, the process determines that the proposed message does contextually fit the messaging session (740, N) and the process proceeds by sending the message (742) as a next message in the messaging session. If instead the thresholds are exceeded (i.e. at least one of them is), then the process proceeds by advising the user who composed the message that the message lacks contextual fit (744). Using the above, based on at least one of (i) the characteristics of the expected group response based on the learned group pattern exceeding the expected response thresholds, (ii) the characteristics of the expected group response based on the recent group pattern exceeding the expected response thresholds, (iii) the characteristics of the expected personal response based on the learned personal pattern exceeding the expected response thresholds, or (iv) the characteristics of the expected personal response based on the recent personal pattern exceeding the expected response thresholds, it is determined that the proposed message does not contextually fit the messaging session.

As an alternative, the determination of contextual fit could be based on some composite where a failure on any of the above four is not necessarily dispositive. For instance, it may be based on an extent to which threshold(s) are exceeded and/or which particular thresholds are exceeded, as some thresholds may be given more weight than others in terms of dictating contextual fit.

Processing is therefore performed based on whether the message is deemed to contextually fit the messaging session. As examples, if it does fit, then the message will be sent (742). If it does not fit, then the user will be advised (744) that it does not fit, and possibly encouraged to modify the message. At that point, the process can determine whether the user has modified the message (746). If the user has modified the message, then this is as if a new proposed message for sending was received. Accordingly, based on a modification of the proposed message by the user to provide a modified proposed message, the method further can repeat (returning to FIG. 7A as indicated). This repetition will determine whether the modified proposed message contextually fits the messaging session based on the characteristics of the expected response, and perform processing (send message or advice lacks contextual fit) based on whether that modified proposed message contextually fits the messaging session.

If the user decides to send the contextually unfitting message anyway (746, N) or if the message is sent by 742, the process proceeds by awaiting the responses to that message and learning, i.e. using those responses to update the group pattern and individual personal patterns. From that point, and depending on the technical implementation of the process, the process can terminate at that point or return to FIG. 7A to poll/await a next proposed message of the session, as examples.

Described herein are aspects for determining whether a proposed message contextually fits a messaging session, and performing related processing based on that determination. Context is used to identify the range of characteristics that a response to a message is likely to take on, given the learned history and recent interactions of the responder(s). This differs from approaches that use a personality profile related to the detected emotion in a message to validate suggestions to a response to that same profile. Aspects described herein learn what messages (which may be text or media based) would and would not contextually fit a conversation involving two or more people. For instance, aspects can advise whether a message proposed by a user to be sent to the rest of the group might elicit a negative response. Aspects can learn from contexts expressed within a conversation, the context formed by sentiment, tone, emotion personality, expressions/words used, and any other components, to advise as to the contextual fit.

Furthermore, it can learn how a group of user's response characteristics, e.g. tone/personality/sentiment of messages, fluctuate, and dynamically and automatically adjust the thresholds to which characteristics of expected responses are compared to determine contextual fit, as a way of guiding the messaging session.

Figure 8A:
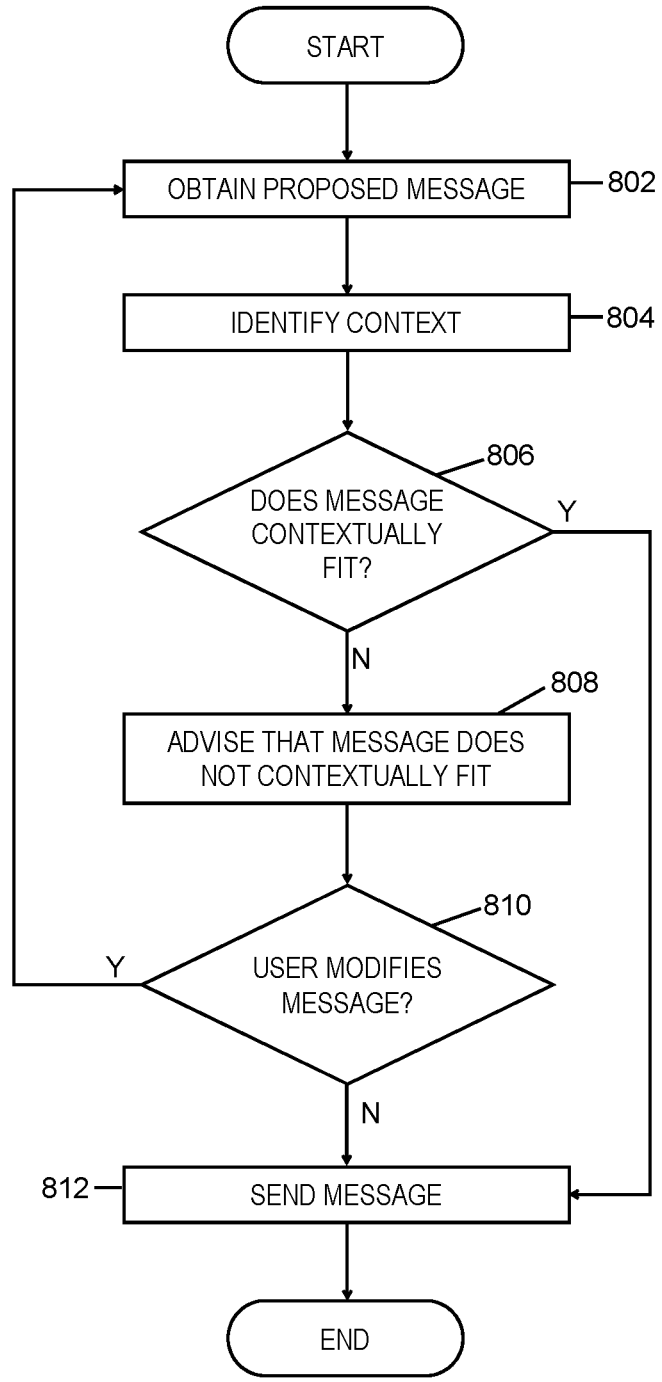
FIG. 8A depicts an example process for contextual fit determination and processing for a proposed message, in accordance with aspects described herein.

FIG. 8A depicts an example process for contextual fit determination and processing for a proposed message, in accordance with aspects described herein. In some examples, the process is performed by one or more computer systems, such as those described herein, which may include one or more computer systems of or in communication with a messaging service, such as a conversation analysis system, and/or one of more other computer systems.

The process begins by obtaining a proposed message to be sent in a messaging session between a plurality of users of a messaging service (802). The plurality of users may include two users, for instance the sending user and one receiving user, or more than two users. The message is a proposed message in that it has been typed or otherwise input to a computer system, such as the user's device, but has not yet been included in the messaging session. For instance, it may have been 'sent' from the perspective of the user but diverted, intercepted, queued, or retained at least temporarily for analysis and handling as described in the rest of the process.

The process then identifies a context of the proposed message (804), for example using cognitive services that analyze the proposed message and return indications of contextual characteristics of the proposed message, e.g., emotion, sentiment, culture, language, common expressions or words, and/or any other contextual characteristics of the proposed message. At that point, the process determines whether the proposed message contextually fits the messaging session (806), for instance based on characteristics of an expected response to the proposed message. The characteristics of the expected response may be based on patterns of communication between the plurality of users. The characteristics of the expected response may indicate how convenient, appropriate, conflict-inducing, etc. the proposed message is. Thus, the contextual fit can account for an anticipated level of conflict anticipated to be experienced if the proposed message were sent as part of the messaging session. The patterns of communication can involve at least some history, recent and/or learned, of the exchange between these users.

In a particular example, determining whether the proposed message contextually fits the messaging session includes:

(i) identifying a pre-established stored context, i.e. in user and/or group pattern(s), to which the context of the proposed message matches. The pre-established stored context has stored expected response characteristics pre-associated therewith. There characteristics are values stored in personal/group patterns;

(ii) using the expected response characteristics pre-associated with the stored context as the characteristics of the expected response. In other words, the values of, e.g., Personality, Emotion, Sentiment, that compose the expected response are the characteristics of the expected response that are used in determining whether the proposed message contextually fits the messaging session; and (iii) comparing the characteristics of the expected response to expected response thresholds applied to the messaging session, where contextual fit of the proposed message is based at least partially on whether one or more characteristics of the expected response exceeds one or more of the expected responses thresholds. As examples, the expected response thresholds may be personal and/or group thresholds. In some aspects, the plurality of users may be associated with personal expected response thresholds and optionally "extreme" expected response thresholds, with each user of the plurality of users being associated with a respective at least one personal expected response threshold of the personal expected response thresholds. The determining whether the proposed message contextually fits the messaging session can further include comparing the characteristics of the expected response to the personal expected response thresholds, where contextual fit of the proposed message is based at least partially on whether a characteristic of the expected response exceeds a personal expected response threshold of the personal expected response thresholds by a configurable margin. In this manner, if a characteristic of the expected response exceeds someone's extreme threshold (personal threshold plus some configurable amount), even though it may not exceed any group thresholds, the proposed message may be deemed to be contextually unfit.

Characteristics of the expected response are determined from one or more of the group consisting of: characteristics of an expected group response based on a learned group pattern for the plurality of users, characteristics of an expected group response based on a recent group pattern for the plurality of users, characteristics of an expected personal response based on a learned personal pattern for a user of the plurality of users, and characteristics of an expected personal response based on a recent personal pattern for a user of the plurality of users. In some examples, the characteristics of the expected response include all four of the above, a composite of the above, or any other function or combination of the above.

Whether the proposed message contextually fits the messaging session may hinge on whether any of the four above exceed expected response threshold(s). In some examples, the message will be deemed to be unfitting even if the proposed message exceeds only one of the learned group, recent group, learned personal, or recent personal thresholds. Thus, based on at least one of (i) the characteristics of the expected group response based on the learned group pattern exceeding the expected response thresholds, (ii) the characteristics of the expected group response based on the recent group pattern exceeding the expected response thresholds, (iii) the characteristics of the expected personal response based on the learned personal pattern exceeding the expected response thresholds, or (iv) the characteristics of the expected personal response based on the recent personal pattern exceeding the expected response thresholds, the determining whether the proposed message contextually fits the messaging session determines that the proposed message does not contextually fit the messaging session.

Referring again to the process of FIG. 8A, after determining whether the proposed message contextually fits the messaging session, the process performs processing based on whether the proposed message contextually fits the messaging session. Different options are available depending on whether the message is deemed to contextually fit the messaging session.

In one aspect, based on determining that the proposed message does contextually fit the messaging session (806, Y), the process performs sending the proposed message (812) as a next message in the messaging session.

In another aspect, based on determining that the proposed message does not contextually fit the messaging session (806, N), the process performs advising a user (e.g. the user who composed the proposed message) that the proposed message does not contextually fit the messaging session (808). At that point, the user may choose to modify the proposed message to provide a modified proposed message. Based on such a modification of the proposed message by the user to provide a modified proposed message (810, Y), the process returns to 802, in which the modified proposed message is regarded as an obtained proposed message for analyzing. The process will repeat aspects, including the determining (806) and the performing processing, where the repeating determines whether the modified proposed message contextually fits the messaging session based on the characteristics of the expected response, and the process performs processing (e.g. 806-Y or 806-N) based on whether the modified proposed message contextually fits the messaging session. If instead at 810 it is determined that the user has not modified the message, for instance the user indicated to send the message as-in despite it being contextually unfitting (810, N), the process proceeds by sending the message 812.

The process of FIG. 8A ends at that point, in this example, though depending on technical implementation, it may be implemented as a loop that returns to 802 to analyze a next proposed message.

If the proposed message or a modified version thereof is sent, additional processing can be performed to analyze the responses to that message. The responses provide not only updated data upon which the characteristics of expected responses in the patterns may be updated, but it also provides an opportunity to adjust expected response thresholds if appropriate.

Figure 8B:
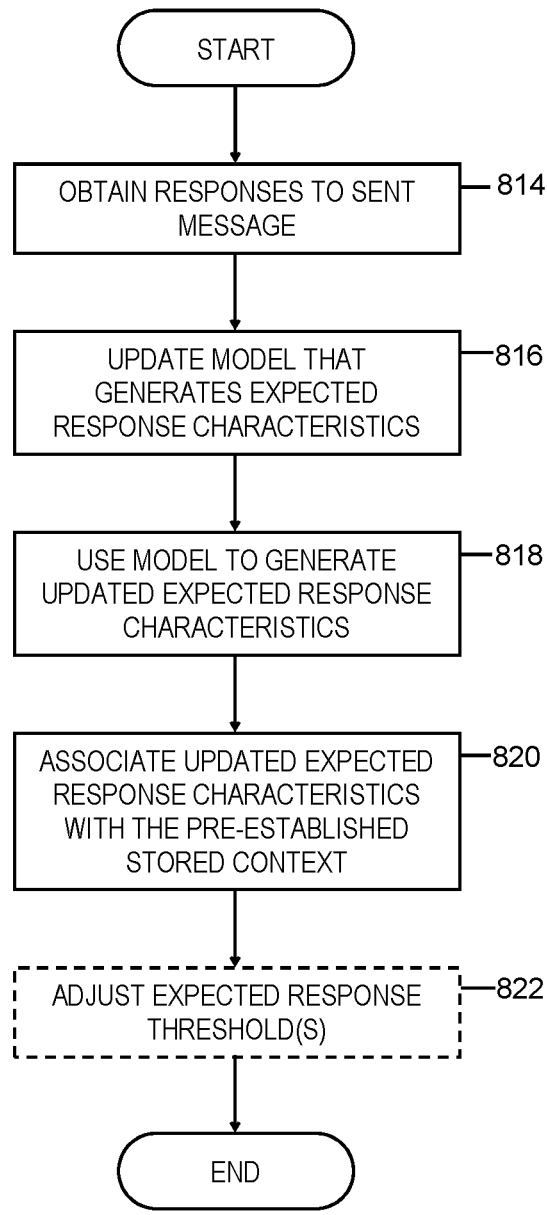
FIG. 8B depicts an example process for updating expected response characteristics based on received responses to a message, in accordance with aspects described herein.

FIG. 8B depicts an example process for updating expected response characteristics based on received responses to a message, in accordance with aspects described herein. Based on the sending of a proposed message or a modified version thereof as a next message in the messaging session, the process begins by obtaining one or more actual responses to the sent message (814), then analyzing those and updating, based on the one or more actual responses, a model that generates the stored expected response characteristics pre-associated with the pre-established stored context (of the sent message to which these are responses) (816). The process can then use that updated model to generate updated expected response characteristics for the pre-established stored context (818) and associate the updated expected response characteristics with the pre-established stored context (820). Therefore, the updated model can re-compute percentages or other values for the characteristics of the expected response, e.g. personality, emotion, sentiment, for each person/group, then update the group/personal pattern(s) involved.

Optionally, the process adjusts an expected response threshold of the expected response thresholds based on the one or more actual responses (822). For instance, based on (i) characteristics of the sent message exceeding at least one expected response threshold of the expected response thresholds and (ii) a configurable amount of the one or more actual responses having characteristics that conform to the characteristics of expected response, the process can adjust the expected response threshold to be less restrictive of contextual fit of proposed messages to the messaging session. Additionally or alternatively, based on (i) characteristics of the sent message conforming to the expected response thresholds and (ii) a configurable amount of the one or more actual responses having characteristics that exceed or approach any expected response threshold by a configurable margin, the process can adjust an expected response threshold to be more restrictive of contextual fit of proposed messages to the messaging session.

Although various examples are provided, variations are possible without departing from a spirit of the claimed aspects.

Figure 9:
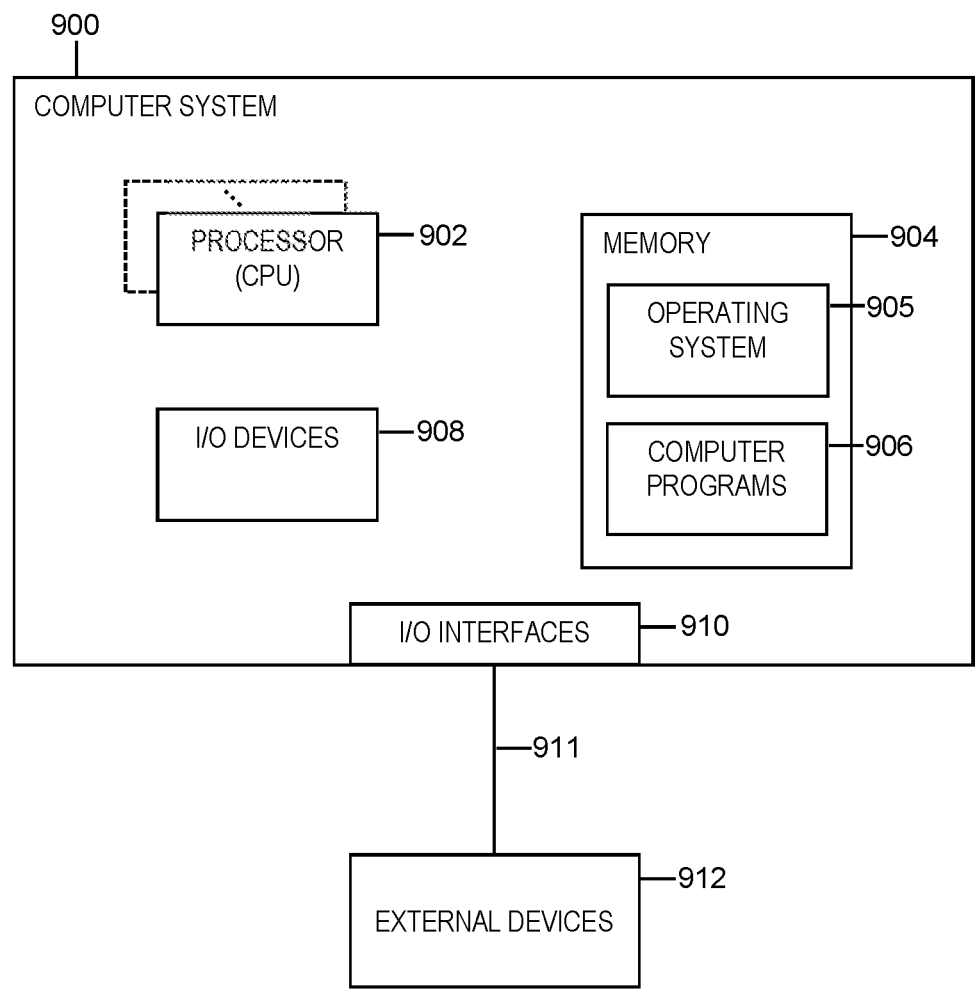
FIG. 9 depicts one example of a computer system and associated devices to incorporate and/or use aspects described herein.

Processes described herein may be performed singly or collectively by one or more computer systems, such as one or more client/user computer devices, such as devices from which the user composes a proposed message, messaging servers, conversation analysis systems, or a combination of the foregoing, as examples. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g. Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC)

system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 10.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 10:
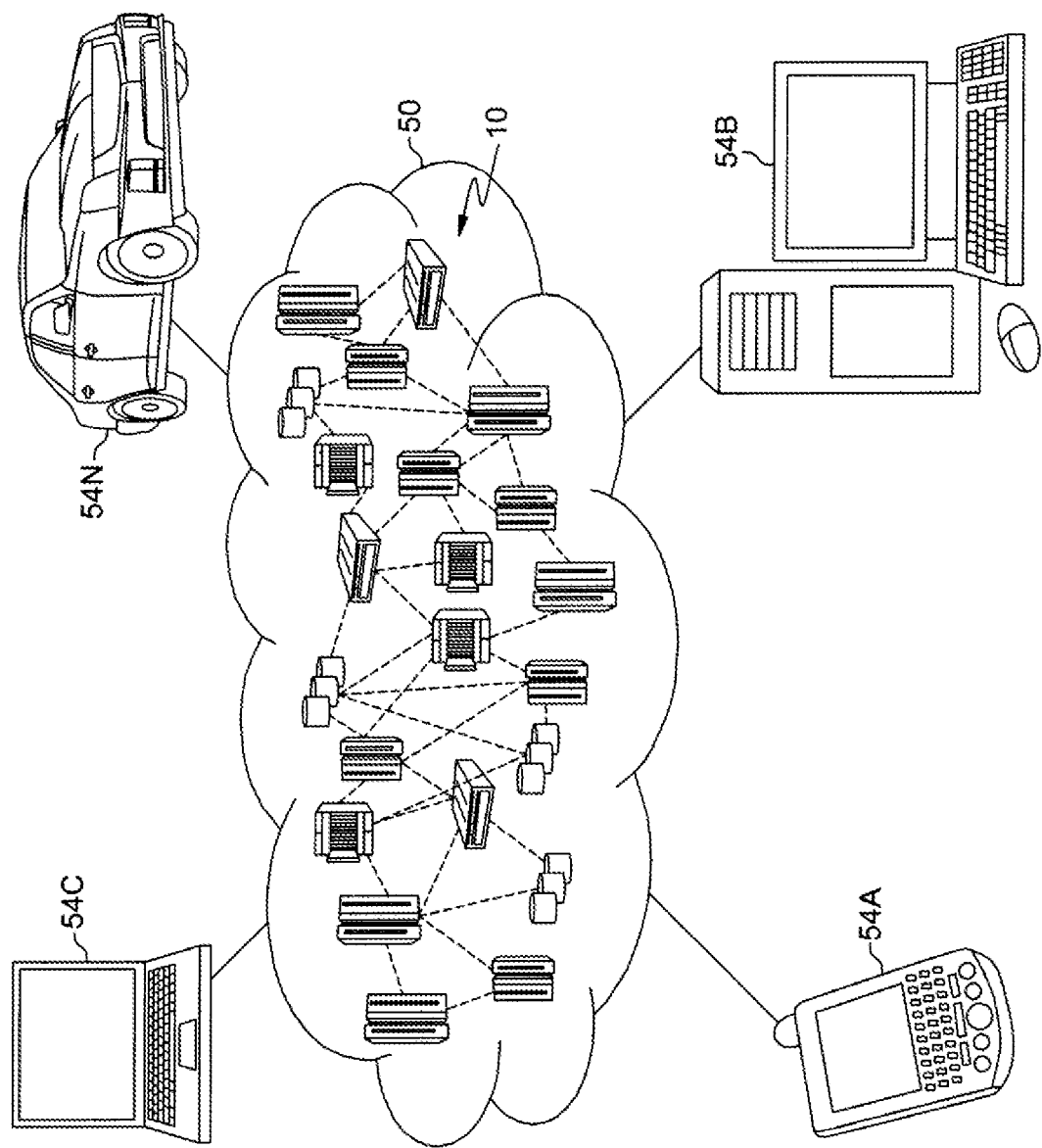
FIG. 10 depicts a cloud computing environment according to an embodiment of the present invention.

Referring now to FIG. 10, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
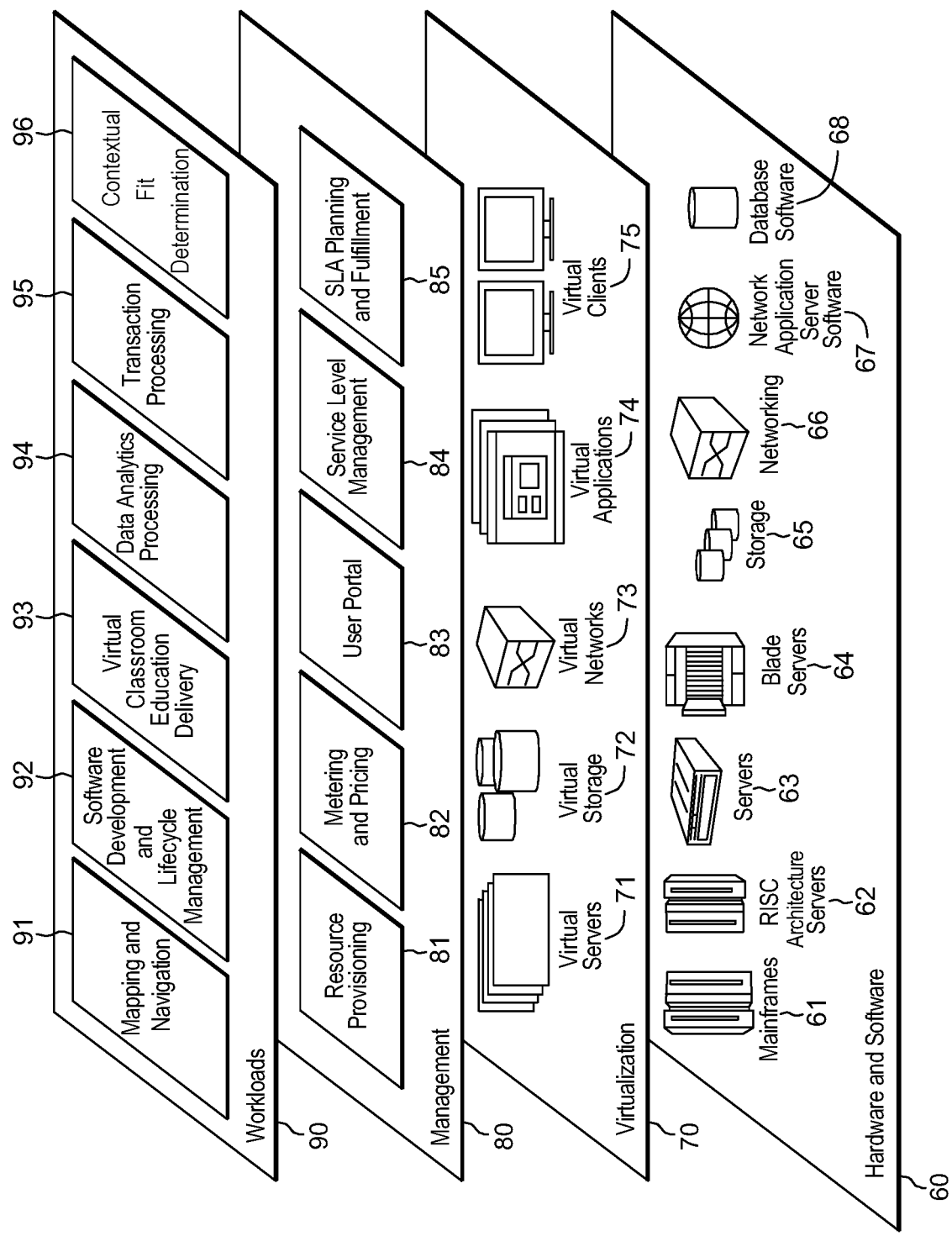
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual fit determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a proposed message to be sent in a messaging session between a plurality of users of a messaging service;
   identifying a context of the proposed message;
   determining whether the proposed message contextually fits the messaging session based on characteristics of an expected response to the proposed message, the characteristics of the expected response being based on patterns of communication between the plurality of users, wherein the determining whether the proposed message contextually fits the messaging session is based on a comparison between an expected response threshold applied to the messaging session and the characteristics of the expected response;
   performing processing based on whether the proposed message contextually fits the messaging session; and
   adjusting the expected response threshold based on one or more responses to the proposed message or a modified version thereof after being sent as a message in the messaging session.

2. The method of claim 1, wherein the characteristics of the expected response are identified from a pre-established stored context.

3. The method of claim 1, wherein based on determining that the proposed message does contextually fit the messaging session, the performing processing comprises sending the proposed message as a next message in the messaging session.

4. The method of claim 1, wherein based on determining that the proposed message does not contextually fit the messaging session, the performing processing comprises advising a user that the proposed message does not contextually fit the messaging session.

5. The method of claim 4, wherein based on a modification of the proposed message by the user to provide a modified proposed message, the method further comprises repeating the determining and the performing processing, wherein the repeating the determining determines whether the modified proposed message contextually fits the messaging session based on the characteristics of the expected response, and the repeating the performing processing performs processing based on whether the modified proposed message contextually fits the messaging session.

6. The method of claim 1, wherein the contextual fit accounts for an anticipated level of conflict anticipated to be experienced if the proposed message were sent as part of the messaging session.

7. A computer system comprising:
a memory; and
a processor in communications with the memory, wherein the computer system is configured to perform a method comprising:
obtaining a proposed message to be sent in a messaging session between a plurality of users of a messaging service;
identifying a context of the proposed message;
determining whether the proposed message contextually fits the messaging session based on characteristics of an expected response to the proposed message, the characteristics of the expected response being based on patterns of communication between the plurality of users, wherein the determining whether the proposed message contextually fits the messaging session is based on a comparison between an expected response threshold applied to the messaging session and the characteristics of the expected response;
performing processing based on whether the proposed message contextually fits the messaging session; and
adjusting the expected response threshold based on one or more responses to the proposed message or a modified version thereof after being sent as a message in the messaging session.

8. The computer system of claim 7, wherein the characteristics of the expected response are identified from a pre-established stored context.

9. The computer system of claim 7, wherein based on determining that the proposed message does not contextually fit the messaging session, the performing processing comprises advising a user that the proposed message does not contextually fit the messaging session.

10. The computer system of claim 9, wherein based on a modification of the proposed message by the user to provide a modified proposed message, the method further comprises repeating the determining and the performing processing, wherein the repeating the determining determines whether the modified proposed message contextually fits the messaging session based on the characteristics of the expected response, and the repeating the performing processing performs processing based on whether the modified proposed message contextually fits the messaging session.

11. The computer system of claim 7, wherein the contextual fit accounts for an anticipated level of conflict anticipated to be experienced if the proposed message were sent as part of the messaging session.

12. A computer program product comprising:
a computer readable storage medium readable by a processing circuit and storing instructions for execution by the processing circuit for performing a method comprising:
obtaining a proposed message to be sent in a messaging session between a plurality of users of a messaging service;
identifying a context of the proposed message;
determining whether the proposed message contextually fits the messaging session based on characteristics of an expected response to the proposed message, the characteristics of the expected response being based on patterns of communication between the plurality of users, wherein the determining whether the proposed message contextually fits the messaging session is based on a comparison between an expected response threshold applied to the messaging session and the characteristics of the expected response;
performing processing based on whether the proposed message contextually fits the messaging session; and
adjusting the expected response threshold based on one or more responses to the proposed message or a modified version thereof after being sent as a message in the messaging session.

13. The computer program product of claim 12, wherein the characteristics of the expected response are identified from a pre-established stored context.

14. The computer program product of claim 12, wherein based on determining that the proposed message does not contextually fit the messaging session, the performing processing comprises advising a user that the proposed message does not contextually fit the messaging session.

15. The computer program product of claim 14, wherein based on a modification of the proposed message by the user to provide a modified proposed message, the method further comprises repeating the determining and the performing processing, wherein the repeating the determining determines whether the modified proposed message contextually fits the messaging session based on the characteristics of the expected response, and the repeating the performing processing performs processing based on whether the modified proposed message contextually fits the messaging session.

16. The computer program product of claim 12, wherein the contextual fit accounts for an anticipated level of conflict anticipated to be experienced if the proposed message were sent as part of the messaging session.

\* \* \* \* \*